(12) United States Patent
Burazerovic (10) Patent No.: US 8,493,448 B2
(45) Date of Patent: Jul. 23, 2013

(54) METHOD AND SYSTEM TO CONVERT 2D VIDEO INTO 3D VIDEO

(75) Inventor: Dzevdet Burazerovic, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 860 days.

(21) Appl. No.: 12/519,378

(22) PCT Filed: Dec. 14, 2007

(86) PCT No.: PCT/IB2007/055123
§ 371 (c)(1),
(2), (4) Date: Jun. 16, 2009

(87) PCT Pub. No.: WO2008/075276
PCT Pub. Date: Jun. 26, 2008

(65) Prior Publication Data
US 2010/0026784 A1 Feb. 4, 2010

(30) Foreign Application Priority Data
Dec. 19, 2006 (EP) .................................... 06126515

(51) Int. Cl.
*H04N 13/02* (2006.01)
(52) U.S. Cl.
USPC .......................................... 348/157; 348/46
(58) Field of Classification Search
USPC .................................... 348/46, 157
See application file for complete search history.

(56) References Cited

U.S. PATENT DOCUMENTS

| | | | |
|---|---|---|---|
| 5,774,357 A * | 6/1998 | Hoffberg et al. ............... | 713/600 |
| 5,828,809 A | 10/1998 | Chang et al. | |
| 5,840,032 A | 11/1998 | Hatfield et al. | |
| 6,266,053 B1 * | 7/2001 | French et al. .................. | 715/255 |
| 7,065,250 B1 * | 6/2006 | Lennon .......................... | 382/224 |
| 2004/0032488 A1 | 2/2004 | Harman | |
| 2004/0246199 A1 | 12/2004 | Ramian | |
| 2006/0061569 A1 * | 3/2006 | Yamada ......................... | 345/422 |

FOREIGN PATENT DOCUMENTS

| | | |
|---|---|---|
| EP | 1128679 A1 | 8/2001 |
| EP | 1150254 A2 | 10/2001 |
| EP | 1551190 A1 | 7/2005 |
| WO | 03049038 A1 | 6/2003 |
| WO | 2005076594 A1 | 8/2005 |
| WO | WO 2005076594 A1 * | 8/2005 |

OTHER PUBLICATIONS

Wan, K. "Efficient Multimodal Features for Automatic Soccer Highlight Generation", Proceedings of International Conference on Pattern Recognition (ICPR 2004), 4-Volume Set, Aug. 23-26, 2004, Cambridge, UK. IEEE COmputer Society, ISBN 0-7695-2128-2, pp. 973-976.*

Saraceno et al: "Indexing Audio-Visual Sequences by Joint Audio and Video Processing"; DEA University of Brescia, Brescia, Italy, PRIP Vienna University of Technology, Vienna, Austria, 6 Page Document, 1998.

Pfeiffer et al: "Automatic Audio Content Analysis"; 1996 ACM Multimedia, pp. 21-30.

* cited by examiner

*Primary Examiner* — Sath V Perungavoor
*Assistant Examiner* — Jeffery Williams (57) ABSTRACT

2D/3D video conversion using a method for providing an estimation of visual depth for a video sequence, the method comprises an audio scene classification (34) in which a visual depth categorization index of visual depth (37) of a scene is made on basis of an analysis of audio information (32) for the scene, wherein the visual depth categorization index (37) is used in a 5 following visual depth estimation (38) based on video information (33) for the same scene, thereby reducing the calculation load and speeding up the processing.

17 Claims, 9 Drawing Sheets

Extreme CU

CU  Medium view

Full view  Long view

METHOD AND SYSTEM TO CONVERT 2D VIDEO INTO 3D VIDEO

FIELD OF THE INVENTION

The invention relates to a method for providing an estimation of visual depth for a video sequence.

The invention also relates to a method for converting 2D images into 3D images wherein the method comprises an estimation of visual depth.

The invention further relates to a system for providing an estimation of visual depth for a video sequence.

DESCRIPTION OF PRIOR ART

Visual depth, i.e. the distance between the point of view and objects in an image, is an important parameter for conversion of an original 2D image into a 3D image. To convert a 2D image into a 3D image a visual depth map has to be produced, wherein to each pixel a depth value, usually called the z-value, is provided. The z-value may be absolute or relative. Using the data on the pixel and the depth map, it is possible to create two images, a left and a right image. The left and right images are combined into a 3D data stream. 3D image display devices consist which are able to produce two slightly different images, which are by a viewer perceived as a left and right image, thus giving the appearance and sensation of a 3D-image.

To accurately produce the left and right image knowledge of the visual depth is useful or needed.

It is known to try to estimate the depth values of pixels within an image from image cues. Such image cues are for instance occlusion (one element of an image being positioned behind another), differences in focus between objects, relative size of the objects, comparison to previous images.

Although such methods may provide reasonable results, the calculation power required for visual depth estimation is usually massive, as is the amount of data concerned. Real time 2D to 3D conversion is difficult, if at all possible.

There is a need for a method which allows reducing the calculation load and thereby enables more efficient depth estimation.

To this end the method in accordance with the invention is characterized in that the method comprises an audio scene classification in which a visual depth categorization index of visual depth of a scene is made on basis of an analysis of audio information for the scene, wherein the visual depth categorization index is used in a following visual depth estimation based on video information for the same scene.

The system in accordance with the invention is characterized in that it comprises an audio classifier to analyze for a scene audio information and classify the scene into a visual depth category on the basis of the analysis, which audio classifier has an output providing a visual depth categorization index of the scene, wherein the visual depth categorization index is provided to a video visual depth analyzer of video information of the same scene.

The invention is based on the insight that there exist a correlation between the audio scene and camera (viewing) distance.

Using audio information scenes can be categorized into visual depth categories, such as extreme close-up, close-up, medium view, etc, i.e. a visual depth categorization index can be given to a scene.

This visual depth categorization index is then used in a further step as information for the visual depth determination on basis of the video information for the same scene.

Analysis of audio instead of video means lowers the computational delay, thanks to a much lower data-throughput of audio. Audio classifiers have been described in the literature that operate tens of times faster than the real time, on basis of time frames several times shorter than one video frame. The information gathered by audio analysis thus does not pose any appreciable computation load and can be performed in real time (or even faster, if the entire audio track of a video program is already available in memory). The information gathered from audio analysis, however, does considerably reduce the computational load in a subsequent video analysis, since the information from the audio classifier is a good starting point.

Preferably the visual depth categorization index comprises probabilities for an audio analyzed scene indicating the probability that a scene falls into one or more visual depth categories.

It is remarked that, within the framework of the invention "index" may be a single indication, such as a single indication of the visual depth category, such as for instance: "this scene is an extreme close-up" or more complex data. In the preferred embodiment the index provides for probabilities that a scene belongs to a certain visual depth category. Such indication can be used by the following visual depth analysis based on video information to quickly i.e. with a relatively fast and simple algorithm, try whether the depth category with the highest probability is the correct starting point, or the next most probable.

The probability information thus provides an opportunity for a more adequate starting point for the visual depth determination. It reduces the chance that the following video depth analysis is, rather than being aided by the information from the audio classifier, misled by this information.

In embodiments the audio scene classification is based on a decision tree, wherein audio cues are analyzed in the form of the decision tree.

In embodiments the audio scene classification is based on a method wherein audio cues are each used to provide a separate classification and to each classification a weight is attributed corresponding to a weight of the audio cue.

In a first embodiment an audio cue is based on speech content. The correspondence between speech and camera distance is found to be relatively high.

In a further embodiment an audio cue is based on music content. It was found that the mood of the music and/or the strength is related to the camera distance.

In yet a further embodiment an audio cue is based on noise.

BRIEF DESCRIPTION OF THE DRAWINGS

These and other advantageous aspects of the invention will be described in more detail using the following figures.

The figures are not drawn to scale. Generally, identical components are denoted by the same reference numerals in the figures.

DETAILED DESCRIPTION OF PREFERRED EMBODIMENTS

The concept of 3D-TV is presently experiencing a true revival, which is reflected in growing investments in- and around existing and new 3D paradigms and technology. Unlike in the past, the current efforts address all facets of the production-consumption chain, i.e. both content and displays, in parallel. While the film industry is advocating 3D-cinema experience based on stereo image recording and viewing, companies are offering solutions to convert such stereo-, or regular 2D video, to formats suitable for rendering on auto-stereoscopic (consumer) displays. At the same time, standardization of such formats is being discussed in forums such as MPEG. All this makes 3D-TV seem to many as catalyst of a next major media impulse.

For a successful introduction of 3D-TV to the market, availability of (automatic) 2D-to-3D conversion is an important ingredient. As only a limited amount of stereo material is available, 3D-TV is only attractive for wide audience if existing material (e.g. DVDs) can be shown in 3D as well. The central idea of this conversion is estimation of depth, that is, quantification as with regard to which objects in the scene (pixels in the image) are closer to the viewer than others. Such conversion can be done by a broadcaster, and the resulting pixel depth-map transmitted on top of the regular TV signal. The conversion at the consumer side, however, allows an evolutionary 3D-TV introduction, which does not require adaptations to the broadcast infrastructure.

Figure 1:
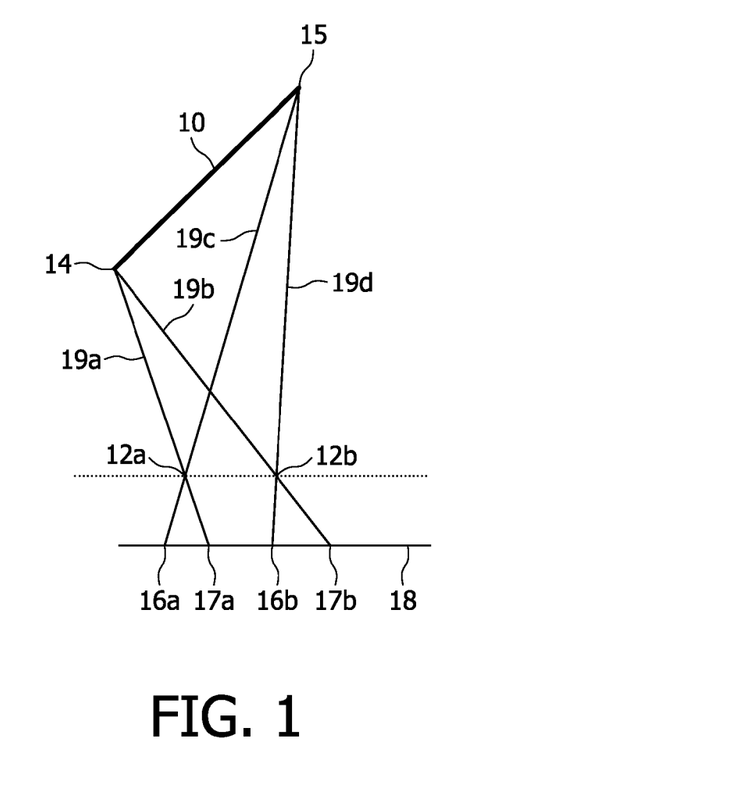
FIG. 1 shows the geometry of part of an image and two orientations.
Figure 2:
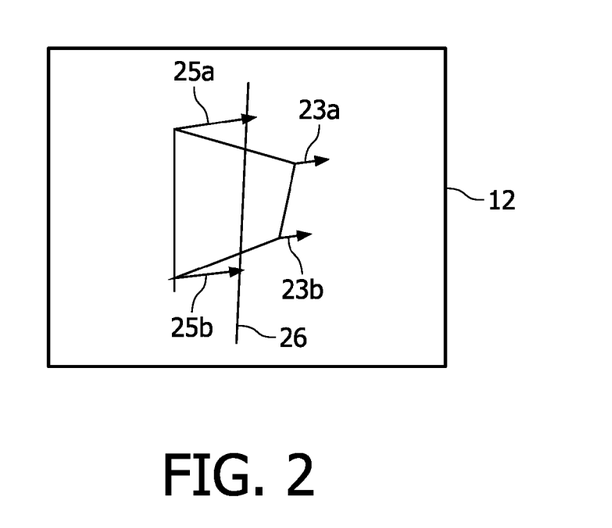
FIG. 2 shows an image of a part of an image.

FIG. 1 shows the geometry of a part of an image 10 and two orientations 12a,b. A part of an image may be for instance a person, or any object within the image. The present invention relates to a method for providing a depth map for an image. A depth map can be seen as attributing a z-value, i.e. a depth value, to points of objects. When images of a scene containing the part of an image 10 are obtained using point projection from different orientations 12a, b, the position where points 14, 15 on the part of an image will be visible in the image are projections 16a, b, 17a, b of points 14, 15. The projections can be illustrated by drawing lines 19a-d from the points 14, 15 through the orientations 12a, b to an image plane 18. For setting out the basic principles, the orientations 12a,b have been selected in a plane parallel to the image plane 18, but the invention is not limited to such a selection of orientations 12a,b. The intersections between these lines 19a-d and the image plane 18 illustrate the positions where the points 14, 15 of the part of an image 10 will be visible in images.

It will be noted that a change of viewpoint 12a, b results in a translation of the position 16a, b 17a, b where a point 14, 15 on the part of an image will be visible in the image plane 18. This translation is inversely proportional to the depth "z" between the viewpoint and the point and proportional to the amount of change in the position of the viewpoint. As a result, the translation will be different for points 14, 15 of the part of an image 10 that have different depths "z" from the orientations 12a, b. When from a two dimensional image the z-depth map is to be made, usually visual cues such as occlusion, size of an object, relative sizes of similar objects, sharpness of the edge of an object etc are used. However, often the results are ambiguous. A tree that is small in pixel size can be small tree nearby, or a large tree at a distance, size therefore is a cue but can be misleading. Whether an object is in focus may indicate that it is a foreground object compared to objects further away. However, whether the distance between the camera and the object is small or relatively large cannot be distinguished. In or out-of-focus thus forms a visual cue but can be misleading. Below more examples of misleading cues will be given.

The inventors have realized that often a number of relatively fixed settings are used, for instance extreme close-up, close-up, medium view, full view and long view. Each of these settings has a more or less characteristic range of camera object distance.

The inventors have furthermore found that there is a correlation between the audio scene, i.e. the sound track associated with a scene, and the camera distance.

This forms the core of the invention: using audio information an index indicating camera distance is given to a scene. Audio information requires much less data and computation power than video data and can be analyzed orders of magnitude faster.

Figure 3:
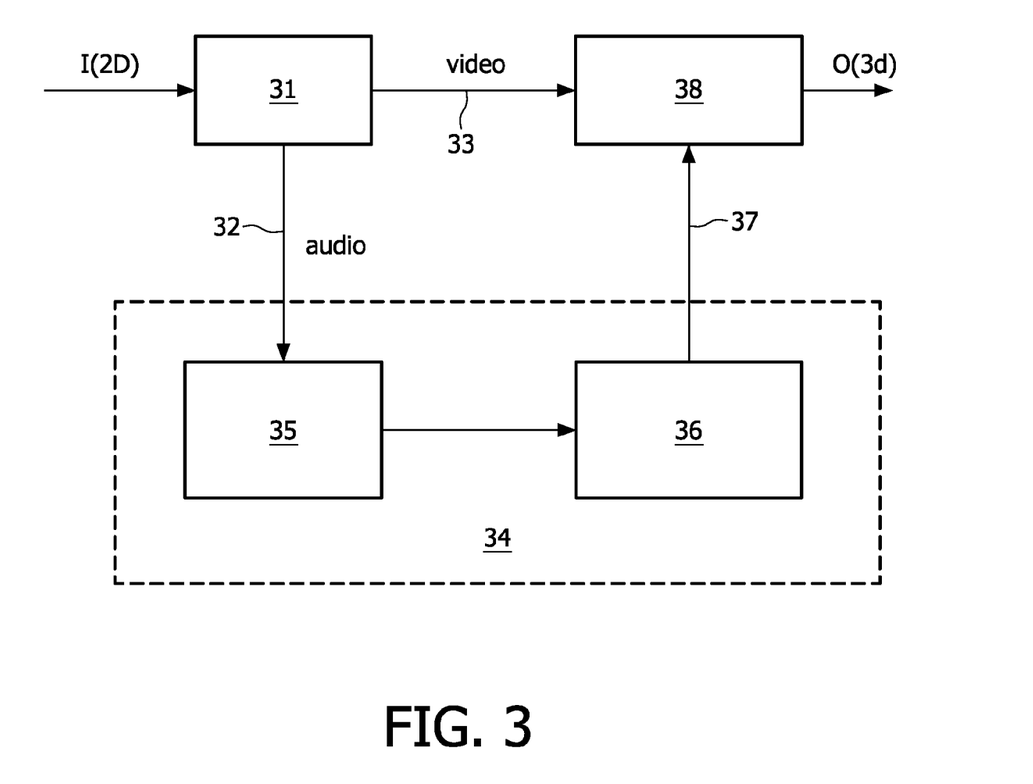
FIG. 3 illustrates schematically the method and system in accordance with the invention.

FIG. 3 illustrates a basic set-up of a method and system in accordance with the invention. This allows for 2D to 3D conversion.

An input signal I(2D), i.e. a video scene in 2 D is split in input 31 into the audio scene part 32 and video scene part 33. The audio scene is sent to an audio classifier 34. The classifier comprises an analyzer 35 which analyses the audio scene generating certain characteristics, such as the presence of speech, the presence of music, the loudness of speech music, noise presence etc. Examples will be given below. This information is used in internal classifier 36 which uses the results of the analysis to classify the audio scene and give it an index 37, the index is for instance a number indicating the scene as extreme close-up, or a table giving the probabilities of the scene being an extreme close-up, a close-up, a medium view etc.

The index 37 is used in a visual depth estimator 38. The visual depth estimator 38 uses on the one hand the index data and on the other hand visual cues in the same video scene to make a depth map. The depth map is added to the image data. By using the depth map the image can now be displayed on a 3D image device.

The advantage of the invention is that by using combined audio and visual cues the 2D to 3D conversion can be much speeded up and often even be done in real time.

Figure 4:
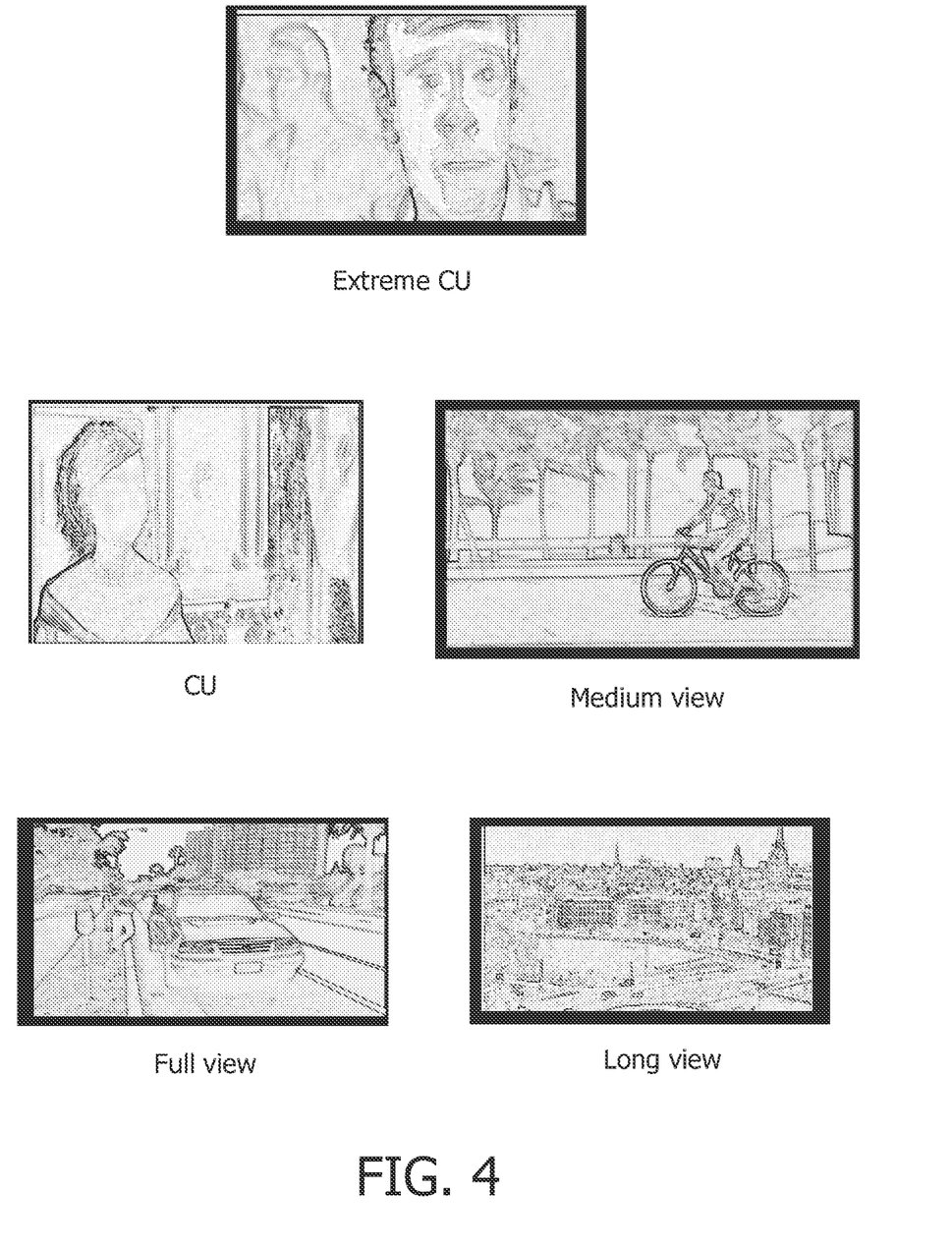
FIG. 4 illustrates typical camera positions.

FIG. 4 illustrates typical camera positions, the extreme close-up (extreme CU), the close-up (CU), the medium view, the full view and the long view. To each of these camera settings a typical distance or typical range of distance between the most important objects and the camera is associated. Although the human eye, or more accurately the human brain, can almost instantly distinguish the various camera set-ups, doing the same by means of visual cues in the video file often requires massive calculation power and even so ambiguous results could occur. Automatic estimation of depth from 2D video inherently relies on heuristic depth cues, each of which is inescapably imperfect and may work better or worse for different types of scenery (e.g. close-up vs. medium-view, indoor vs. outdoor).). Visual scene classification from images has been studied as a separate problem, and many solutions have been proposed that, in one way or another, involve techniques such as (multivariate) pattern analysis and/or supervised learning. However, when taking as input the high-throughput video data (a number of images per second), these techniques often induce significant computational delay, for which reasons they do not lead to practical 2D-to-3D video conversion systems.

This means that it is highly desired to have a mechanism to detect different types of scenes, such that adequate (dynamic) mixing or switching between the cues becomes possible.

The inventors have found that there is a correlation between the audio scene and the camera setting. Audio scenes can be analyzed and categorized orders of magnitude faster, since the amount of data is orders of magnitude smaller. This detection by audio allows a very fast, be it possibly crude categorization of scenes in one of the camera set-ups. This categorization provides a very important cue to be used in the visual analysis, usually as a starting point for one or more of the parameters for the algorithms used in the visual depth analyzer 38. The invention effectively exploits the fact that in video, and especially film, conjunction and specifics of various acoustic sources (e.g. speech, film score, environmental sounds, . . . ) tell a great deal about the scene. There is a correlation between the audio scene and camera (viewing) distance.

It is remarked that it has been known to categorize audio scene as for instance monologue and dialog, indoor-outdoor scenes but no link has been made with categorization of camera settings or with the use of such categorization in 2D to 3D conversion of images.

Figure 5:
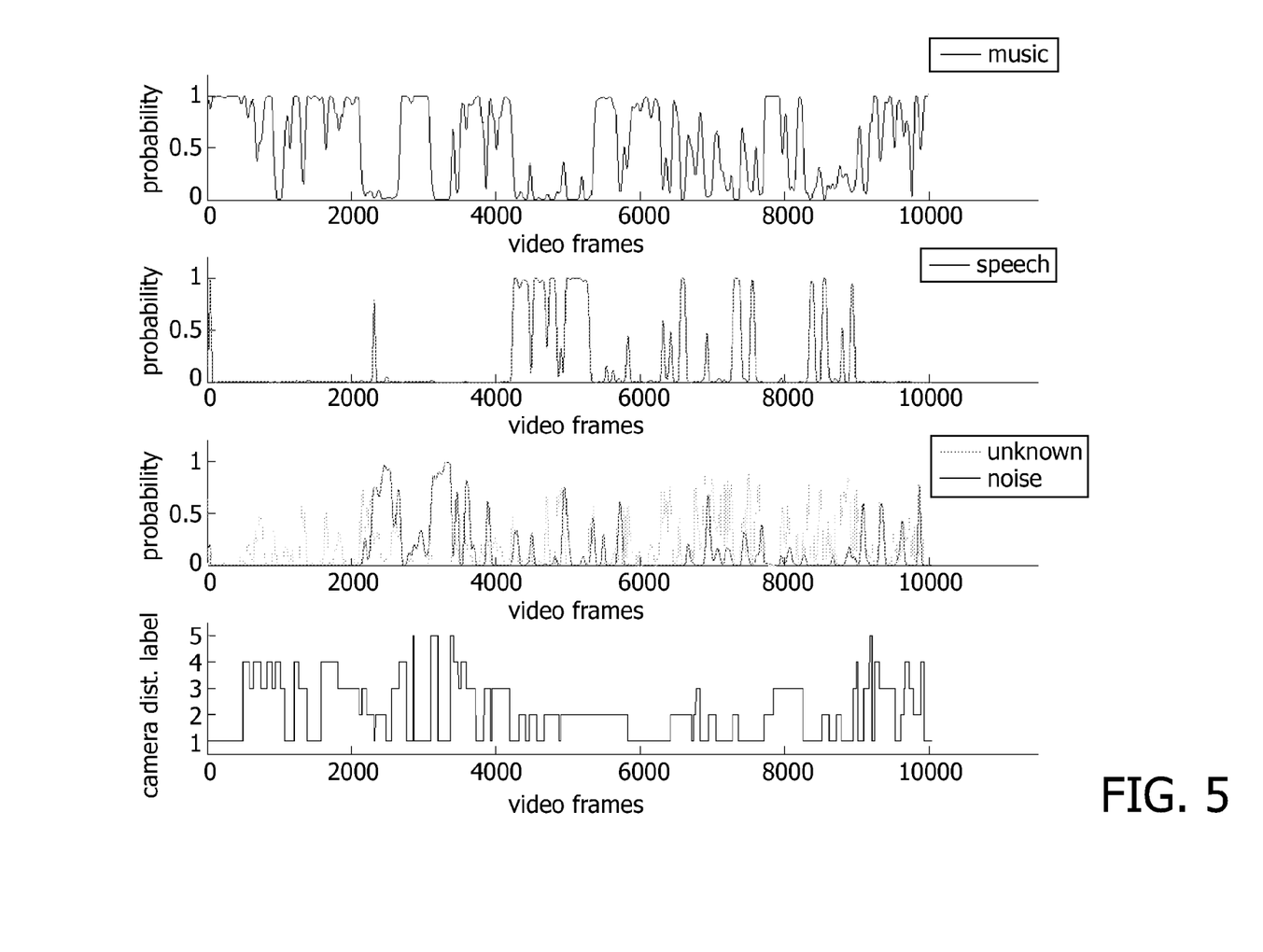
FIG. 5 illustrates some experimental results.

FIG. 5 illustrates some experimental results. FIG. 5 illustrates the correlation between the audio scene composition and camera distance wherein 1="extreme close-up", 2="close-up", 3="medium view", 4="full view", 5="long view". FIG. 5 concerns experiments with an arbitrarily chosen (~7 minutes long) excerpt from a movie ("Pirates of the Caribbean"). The upper parts depict results of an audio classifier, run on the audio track of this video sequence. Although inescapably imperfect, these results have been found to approach well the true situation. The bottom of the picture shows a frame-accurate manual annotation of this video in terms of the camera distance. By comparing the different figures, a couple of important observations can be made:
1. Intervals with high speech activity almost always correspond to smaller camera distances (close-ups and extreme close-ups);
2. Intervals with pronounced background-music and lacking speech (but including other acoustic sources), often correspond to longer camera distances (medium-view, full-view and long-view).

Thus an audio classifier enables in many instances to make a prediction on the camera distance.

The problems associated with 2D to 3D conversion will now be discussed in some more detail.

Figure 6:
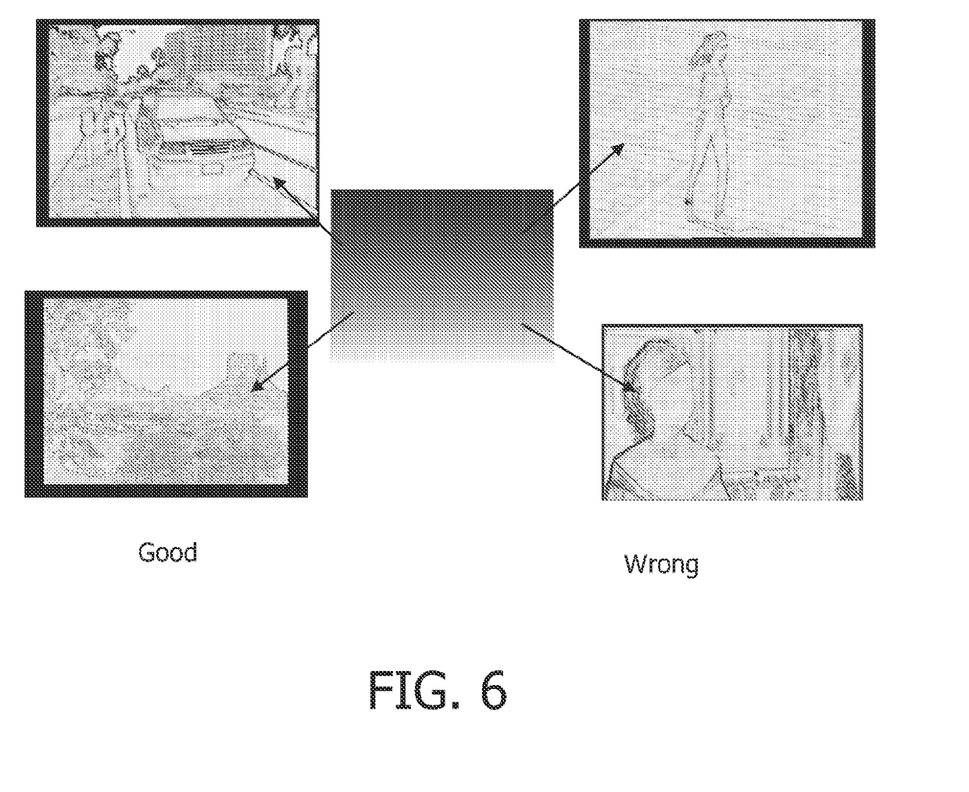
FIG. 6 is an illustration of the dependency of a typical visual depth cue.

Many systems for estimating depth from 2D video use static depth profiles, either as a starting point for processing or even as a full cue. FIG. 6 is an illustration of the dependency of such a depth profile on the type of the visual scene. In the depth-map, darker means further away (from the viewer).

FIG. 6 shows that, apparently, this cue suits well medium-view shots (e.g. outdoor) with a clear separation between the ground plane and the horizon, but certainly not close-ups and extreme close-ups, where a same object extends across a large portion or entire picture height.

Some other examples where the type of scene may determine the course and performance of computer-based depth estimation are:
Motion scenes—include motion of objects or of a camera recording the scene, sometimes simultaneously. The presence and level of complexity of motion can be important parameter, since accurate estimation of the motion flow can enable to infer occlusion (and thus depth) relationships in the scene.

Complex scenes—contain multiple objects and (textured) backgrounds. The level of visual heterogeneity can be decisive for the ability to perform adequate object-boundary segmentation, which in turn can be used to infer depth (dis)continuities.

To avoid the inhibiting effect of the diversity of visual scenery on the performance of computer-generated visual depth cues, we propose to discriminate some characteristic types of scenery and adjust the computation, mixing and possible post-processing of those depth cues accordingly.

Features and embodiments of the invention are as follows:
1. We start from the observation that much scenery in video is inherently driven by audio, which is most true for narrative content coming from professional TV and movie production.
2. The central idea of the invention is to give a 2D-to-3D video conversion scheme access to the output of an audio classifier—taking as input the audio track of the video to be converted. The audio classifier outputs a visual depth categorization index, which may includes probabilities by which it assigns each audio frame to each from one or a set of audio classes, such as speech, music, silence, noise, environmental sound, etc. By analyzing these probabilities during a certain interval of video (several frames), one can obtain clues about the scene type. For example:
High activity of speech indicates a high chance of having a dialogue, and thus a close-up shot.
High activity of background music and/or environmental sounds (possibly in conjunctions with speech) indicates a high chance of having an action, and thus a complex (motion) scene.

More sophisticated decision strategies are certainly feasible and some will be discussed later on.

Furthermore, if an audio segment is found to belong to a single (dominant) audio class, it may be submitted to further analysis specific for that class, like:
Speaker (change) tracking—knowing that a segment of speech interchangeably belongs to different speakers increases the likelihood of a dialogue, and thus a close-up shot.
Music tempo analysis—dynamic film score is commonly used to follow intense action, and thus it can be indicative of a (complex) motion scene.
Music mood analysis—"dramatic" film score is often used to announce of follow suspense, which is usually filmed as an interchange of close-ups and medium-views.
Sub-classification of e.g. "noise" or "environmental sounds" as crowd, applause, shots, explosions, etc, can give useful cues about the act and its environment (indoor, outdoor, etc.).

Analysis of audio instead of video means lowering the computational delay, thanks to a much lower data-throughput of audio.

Being obtained at such speed, the decisions (scene classification index) obtained from audio information is complemented with decisions coming from additional image analysis, to improve reliability.

Figure 7:
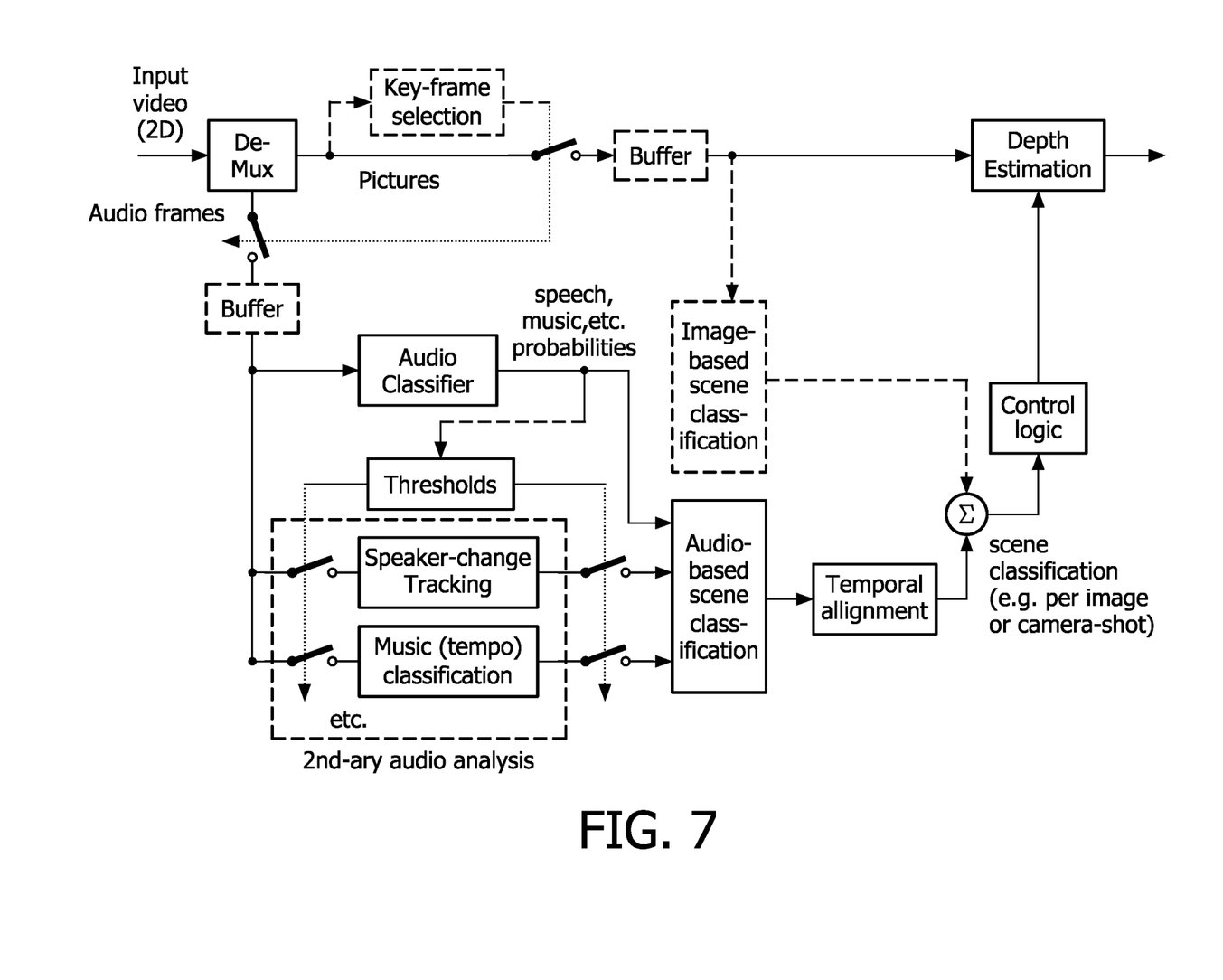
FIG. 7 gives a global view of an exemplary implementation of the method.

FIG. 7 gives a global view of an exemplary implementation of the method. The different processing steps are explained in more detail below. It is remarked that at least the components depicted by dashed lines are optional to the basic proposal.
Data buffering—this is especially useful in non-real time 2D-to-3D video conversion, where the scene classification could apply to larger intervals of video, e.g. a number of frames contained in between a pair of key frames (e.g. detected boundaries of a camera shot).

Figure 8:
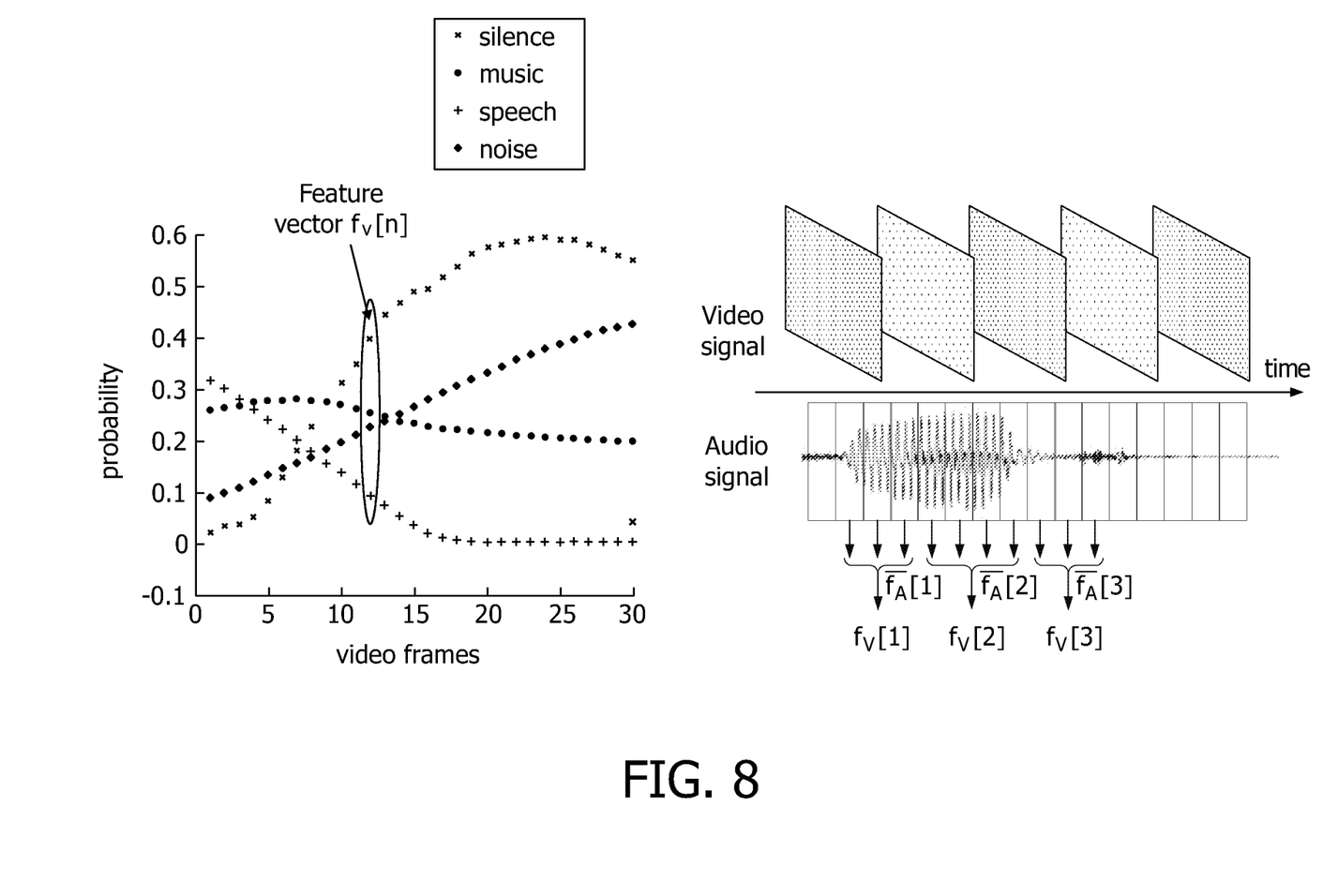
FIG. 8 illustrates audio classification (left) and temporal alignment of audio- and video-frame data (right)

Audio classifier—assigns, to each audio frame, probability by which that frame can be assigned to each out of pre-defined set of classes, such as speech, music, silence, noise, environmental sounds, etc. In the literature, various algorithms are reported that can perform fast and reliable audio classification, where the probabilities of various audio classes are often computed non-cumulatively, i.e. independently from each other. FIG. 8 shows a possible output of such an existing classifier.

Thresholds—may be applied to the dominant (highest) and/or other non-zero probabilities, as a way of deciding that the audio frame come from a single acoustic source (audio class).

Secondary audio analysis—refers to processing specific for a certain audio class, such as:
  Speaker (change) tracking: while speaker recognition is generally a difficult problem, recognition of only a change of speakers, without worrying about their exact identity, is feasible.
  Music tempo analysis: this is covered by an extension of the system, including also some more advanced analysis of music, regarding its mood, beat, tonality, etc.
  Classification of environmental sounds into crowd, gunshots, explosions, etc.

Audio-based visual scene classification—refers to analysis of audio-class probabilities, and possible other information obtained from the secondary audio analysis, for the purpose of classifying a certain video time frame according to the type of scenery it represents. The analysis could connote simple rule-based logic or more sophisticated processing, as will be explained in the sequel.

Temporal alignment—aligns the classification obtained from audio at the rate of video. This can be achieved by averaging of interpolating audio-frame based data, minding the timestamps available for each video and audio frame. This is also illustrated in FIG. 8.

Control logic—connotes rules for switching a certain depth index, or adjusting its computation (e.g. initialization, parameter-setting) or weight, according to the detected scene type.

Depth estimation—refers to generation of a depth-map for an image from any depth index, usually performed by summation of the depth-maps coming from all the cues, each taken with a certain weight.

FIG. 8 illustrates audio classification (left) and temporal alignment of audio- and video-frame data (right). The alignment is here achieved by averaging the (higher rate) audio-frame data between each two consecutive video frames. Note that a feature vector could effectively be a scalar, a "scene-label index", representing the result of scene classification.

Figure 9:
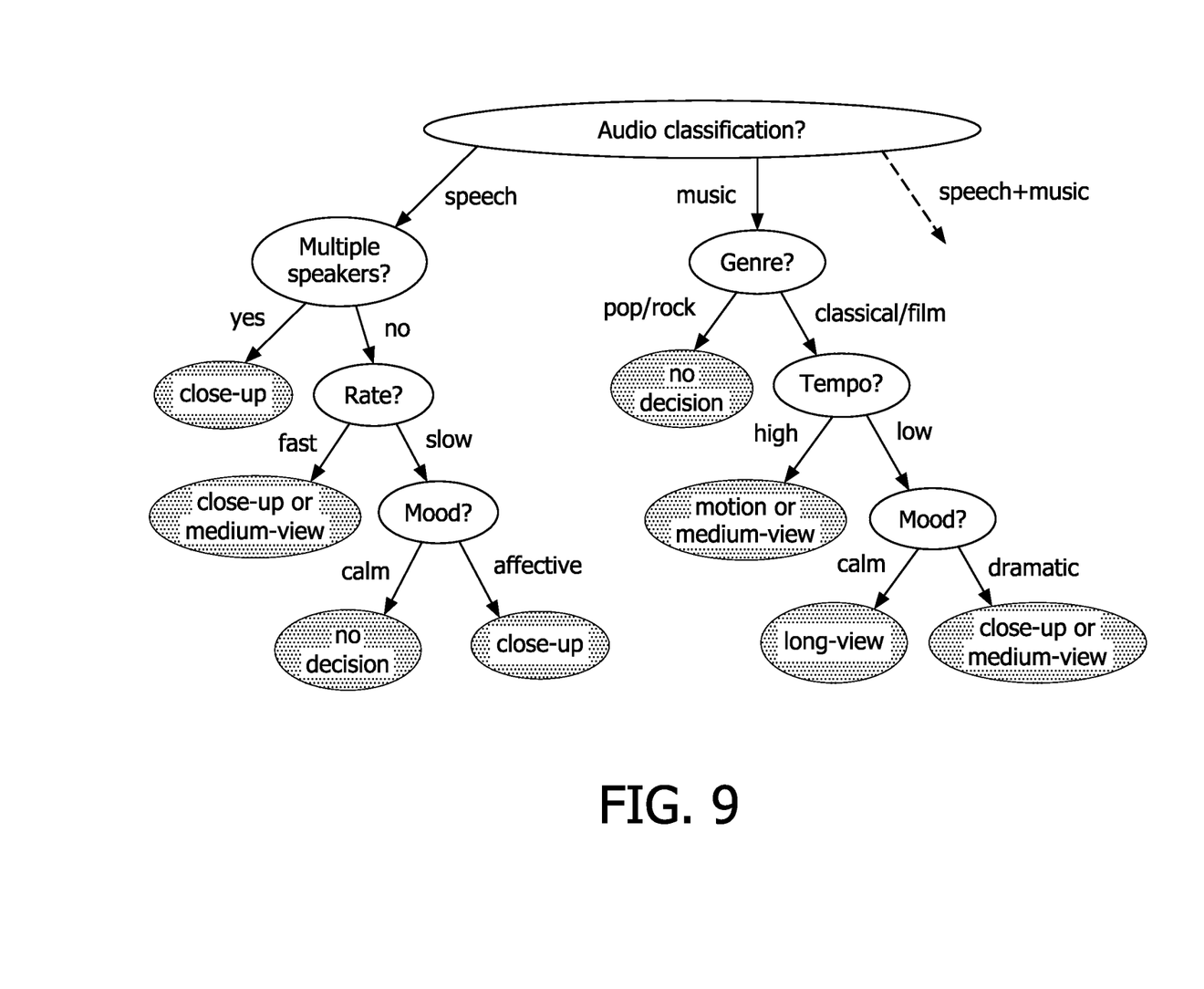
FIG. 9 shows an example of a decision tree.

There are several ways to use the audio cues to provide for visual depth categorization index. A simple way to utilize audio cues is to use rule-based logic, via decision trees. Decision trees classify a pattern through a sequence of questions, in which the next question depends on the answer to the current question. FIG. 9 shows an example. The connotation and implementation of audio classification, speaker-change tracking and music-tempo analysis were mentioned earlier. The quantification of speech rate and mood is a facet of standard analysis of prosody, referring to 'suprasegmental' aspects of spoken language, e.g. variations in pitch, duration, loudness and timbre. Such cognitive analysis is more difficult for music; still, various studies have been reported, exploring signal processing and pattern classification techniques (e.g. neural networks) taking intensity, timbre and rhythm-related features extracted from the acoustic signal. Note that the classification in terms of camera distance is in accordance with, where five distances are defined: extreme close-up, close-up, medium-view, full-view and long-view. Also, some of the branches end up in ambiguous classifications, which are cleared up by the additional (image-based) analysis.

A useful embodiment is one wherein the decision is at least partly based on character information. Character information is for instance the director's name, or the name of actors. Certain directors have a particular style. Some directors make much more use of close-ups then others. Likewise, some actors are very prone to be taken in a close-up (usually the leading roles) while others are much less taken in close-up. Using this information which is usually available a more accurate prediction is possible.

Another suitable methodology for implementing the invention is Bayesian inference. It prescribes a basic rule interconnecting posterior probability of a state of nature (e.g. type of visual scene), a prior probability of that state, and a measurement of some features from the nature (e.g. audio classification). Equation (1) shows this rule, while below equation 1 further clarification is given by means of a notational example. Each Bayesian belief net consists of nodes and their associated states. The links between nodes represent direct causal influence based on evidence. For instance, node B may have states $\{b_1, b_2, \ldots\}$, collectively denoted by b; P(b) then refers to prior probabilities $\{P(b_1), P(b_2), \ldots\}$ and P(c|b) to conditional probabilities (likelihood) of c given the occurrence of b All priors and likelihood can be used via Equation (1) to compute posterior probabilities, which are used to form a decision rule.

$$p(\omega_j \mid x) = \frac{p(x \mid \omega_j) \cdot P(\omega_j)}{\sum_{j=1}^{c} p(x \mid \omega_j) \cdot P(\omega_j)} \quad (1)$$

$a_1$ = movie
$a_2$ = documnmentary
$\omega_1$ = close-up
$\omega_2$ = medium-view
$\omega_3$ = long-view
$b_1$ = speech
$b_2$ = music
$b_3$ = environm.sound $$p(\omega_j \mid x) = \frac{p(x \mid \omega_j) \cdot P(\omega_j)}{\sum_{j=1}^{c} p(x \mid \omega_j) \cdot P(\omega_j)} \quad (1)$$

| P(a) | |
|---|---|
| P(a₁) | P(a₂) |
| 0.58 | 0.42 |

| P(ω\|a) | | | |
|---|---|---|---|
| | $P(\omega_1 \mid a_i)$ | $P(\omega_2 \mid a_i)$ | $P(\omega_3 \mid a_i)$ |
| $a_1$ | 0.4 | 0.35 | 0.25 |
| $a_2$ | 0.23 | 0.36 | 0.41 |
| $c_1$ = low | | $P(b\|\omega) = \ldots$ | |
| $c_2$ = high | | $P(c\|\omega) = \ldots$ | |

In a Bayesian classifier the estimation of (class-conditional) probabilities plays a decisive role. In some cases, taking standard distributions (e.g. Gaussian) for various probabilities may suffice; in others, estimating (e.g. off-line) these distributions from training samples will be more proper.

Control logic means rules for switching (weighting) of various visual depth cues, or adaptation of their computation (initialization, parameter-setting, etc.) and possible post-processing, according to the detected scene-class information. Several such rules are conceivable, and they can be made more or less conservative, depending on empirical evidence—while certain characterization of a scene (e.g. in terms of camera distance) may be decisive for some depth cues, it may be more "neutral" for others. Assessment of various options is a subject of ongoing investigation, as will also be addressed in the next section. For now, we show some plausible constructions, which well illustrate the principal idea.

A pseudo-code of a possible logic for controlling the depth-estimation based on scene classification is given below. It shows how the choice and deployment of some common depth cues or depth-estimation strategies could be governed by the obtained classification. The implementation of such depth cues may vary and comprise any from a multitude of algorithms reported in the literature.

```
if (video_genre=='movie') {
  while (shot_nr ≤ last_shot) {
    switch (scene_classification[shot_nr].viewing_distance) {
      case: 'close_up'
        apply_static_depth_slant=FALSE;
        estimate_camera_motion=TRUE;
        apply_face_detection=TRUE;
      case: 'extreme_close_up' /* cannot be detected only from audio */
        apply_static_depth_slant=FALSE;
        estimate_defocus=TRUE;
      case: 'medium_view'
        estimate_motion_flow=TRUE;
        estimate_(de-)occlussions=TRUE;
      case: 'full_view'
        apply_static_depth_slant=TRUE;
        slant_profile= "quadratic";
        estimate_background=TRUE;
      case: 'long_view'
        apply_static_depth_slant=TRUE;
        slant_profile="linear";
        estimate_vanishing_lines=TRUE;
      /* etc. */
    }
  }
} /* end of movie */
```

It is remarked that "visual depth categorization index" may be a simple index giving an indication of the depth of view, but may also be more detailed.

Figure 10:
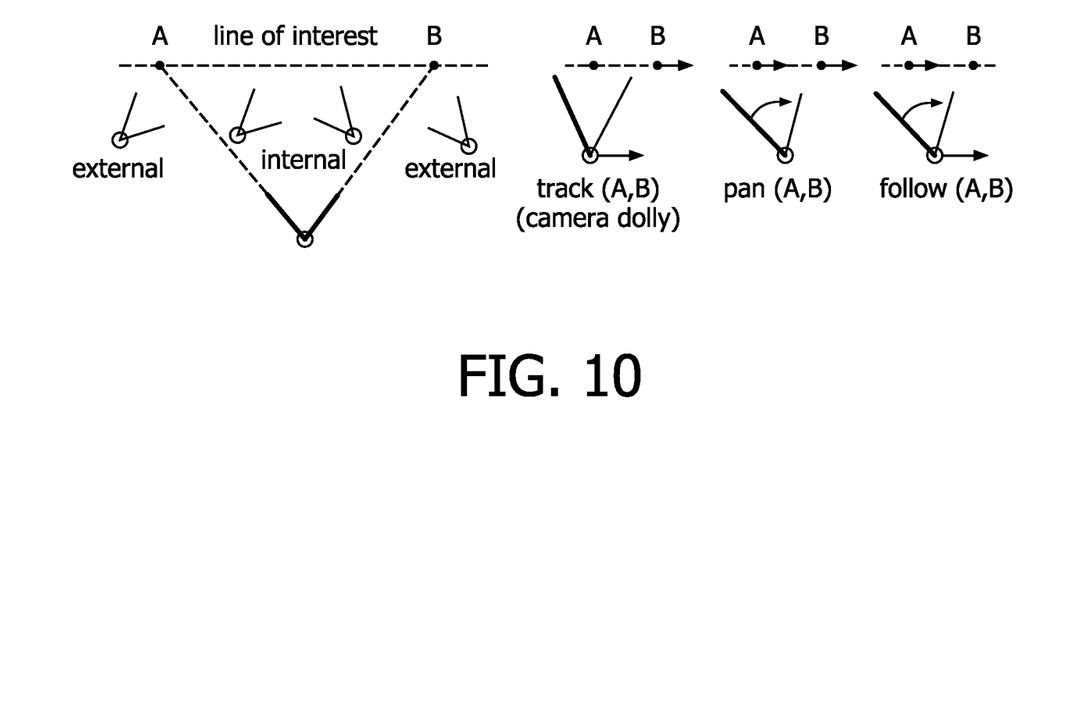
FIG. 10 shows an example related to the camera orientation and movement.

Apart from the viewing distance, movie-makers use many other formal definitions and conventions. FIG. 10 shows an example related to the camera orientation and movement. For instance, "tracking" of an object (see FIG. 10 below) is unlikely to be accompanied with a lot of talking (speech). At the same time, the object-tracking may largely impact algorithms that estimate depth using assumption about the motion (here, not only is the object moving, but also the background is changing) and/or visual heterogeneity. Thus the audio scene is used to create visual depth categories relate to cinematographic syntax elements as with regard to the camera positioning (viewing distance, visual depth) and movement in the scene. The visual categorization index then has at least two components, visual depth and movement and/or visual heterogeneity. The movement may comprise an indication of speed, often there is a correlation between the sound and the speed of movement, wherein loud and fast music and speech is an indication of fast movement, or fast change in camera position, whereas easy listening music is associated with relatively slow movements.

In preferred embodiments use is made of Fuzzy logic to extract from the audio cues a visual depth categorization index.

The invention is also embodied in any computer program comprising program code means for performing a method in accordance with the invention when said program is run on a computer as well as in any computer program product comprising program code means stored on a computer readable medium for performing a method in accordance with the invention. Computer program products can for instance include a graphic processor for a game-console.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The present invention has been described in terms of specific embodiments, which are illustrative of the invention and not to be construed as limiting. The invention may be implemented in a method and a device, in hardware, firmware or software, or in a combination of them. Other embodiments are within the scope of the following claims.

The invention claimed is:

1. Method for providing an estimation of visual depth for a video sequence, wherein the method comprises an audio scene classification in which a visual depth categorization index of visual depth of a scene is made on basis of an analysis of audio information for the scene, wherein the visual depth categorization index is used in a following visual depth estimation based on video information for the same scene;
wherein said visual depth estimation comprises an estimation with respect to at least one object in the scene of whether said object appears to a viewer of the scene to be closer than another object in the scene.

2. Method as claimed in claim 1, wherein the visual depth categorization index comprises probabilities for an audio analyzed scene indicating the probability that a scene falls into one or more visual depth categories.

3. Method as claimed in claim 1, wherein the visual depth index comprises data relating to cinematographic syntax and conventions as with regard to camera positioning (viewing distance) and movement and/or visual heterogeneity.

4. Method as claimed in claim 1, wherein the audio scene classification is based on a decision tree, wherein audio cues are analyzed in the form of the decision tree.

5. Method as claimed as claimed in claim 1, wherein audio scene classification is based on a method wherein audio cues are each used to provide a separate classification and to each classification a weight is attributed corresponding to a weight of the audio cue.

6. Method as claimed in claim 1, wherein a correlation between audio and video scene classification is established using Fuzzy logic (clustering).

7. Method as claimed in claim 1 wherein speech content is a cue.

8. Method as claimed in claim 1 wherein music content is a cue.

9. Method as claimed in claim 1 wherein the conjunction of non-speech and non-music sounds recorded from the visual scene or created during filet post-production is a cue.

10. Method for converting a 2D video into a 3D video wherein a method for an estimation of visual depth as claimed in claim 1 is used.

11. Computer program product comprising program code means stored on a non-transitory computer readable medium for performing a method as claimed in claim 1 when said program is run on a computer.

12. System for providing an estimation of visual depth for a video sequence, wherein the system comprises an audio classifier to analyze for a scene audio information and classify the scene into a visual depth category on the basis of the analysis, which audio classifier has an output providing a visual depth categorization index of the scene, wherein the visual depth categorization index is provided to a video visual depth analyzer of video information of the same scene;
wherein said video visual depth analyzer provides a visual depth estimation of the scene which comprises an estimation with respect to at least one object in the scene of whether said object appears to a viewer of the scene to be closer than another object in the scene.

13. System as claimed in claim 12, wherein the visual depth categorization index comprises probabilities that that a scene falls into one or more visual depth categories.

14. System as claimed in claim 12, wherein the analyzer is arranged to classify on basis of a decision tree.

15. System as claimed in claim 12, wherein the analyzer is arranged to classify based on a method wherein audio cues are each used to provide a separate classification and to each classification a weight is attributed corresponding to a weight of the audio cue.

16. System as claimed in claim 12, wherein the analyzer is arranged to classify based Fuzzy logic (clustering).

17. System as claimed in claim 12, wherein the system converts 2-D image data into 3-D image data.

* * * * *